US012794330B2

(12) United States Patent
Choi et al.

(10) Patent No.: US 12,794,330 B2
(45) Date of Patent: Nov. 10, 2026

(54) HYBRID MOTOR

(71) Applicants: HYUNDAI MOTOR COMPANY, Seoul (KR); KIA CORPORATION, Seoul (KR); IUCF-HYU (INDUSTRY-UNIVERSITY COOPERATION FOUNDATION HANYANG UNIVERSITY), Seoul (KR)

(72) Inventors: Jin Ho Choi, Suwon-si (KR); Jong Seok Lee, Suwon-si (KR); Jin Cheol Park, Seoul (KR); Sung Woo Hwang, Seoul (KR); Myung Seop Lim, Seoul (KR); Jae Hyun Kim, Seoul (KR)

(73) Assignees: HYUNDAI MOTOR COMPANY, Seoul (KR); KIA CORPORATION, Seoul (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 169 days.

(21) Appl. No.: 18/894,284

(22) Filed: Sep. 24, 2024

(65) Prior Publication Data

US 2025/0015694 A1 Jan. 9, 2025

Related U.S. Application Data

(62) Division of application No. 17/850,222, filed on Jun. 27, 2022, now abandoned.

(30) Foreign Application Priority Data

Sep. 9, 2021 (KR) ........................ 10-2021-0120179

(51) Int. Cl.

*H02K 21/46* (2006.01)
*H02K 16/04* (2006.01)
*H02K 17/26* (2006.01)

(52) U.S. Cl.

CPC ............. *H02K 21/46* (2013.01); *H02K 16/04* (2013.01); *H02K 17/26* (2013.01)

(58) Field of Classification Search

CPC ......... H02K 16/04; H02K 17/26; H02K 21/46

(Continued)

(56) References Cited

U.S. PATENT DOCUMENTS 4,139,790 A * 2/1979 Steen ..................... H02K 21/46 310/212
4,568,846 A * 2/1986 Kapadia ................. H02K 21/46 310/156.83

(Continued)

FOREIGN PATENT DOCUMENTS

CN 107026544 A 8/2017
CN 103872868 B 4/2018

(Continued)

OTHER PUBLICATIONS

Xu et al., English Machine Translation of CN110460217 (Year: 2019).*

*Primary Examiner* — Rashad H Johnson

(74) *Attorney, Agent, or Firm* — MCDONNELL BOEHNEN HULBERT & BERGHOFF LLP

(57) ABSTRACT

A hybrid motor includes an induction motor and a synchronous motor combined. The hybrid motor includes a hollow rotor that includes conductor bars configured to form an annular shape at a position spaced apart from a rotation axis by a predetermined first distance and a synchronous motor equivalent that is disposed in an annular shape at a position spaced apart from the rotation axis by a predetermined second distance, an induction stator that includes induction (Continued)

stator windings positioned on a first radial side of the hollow rotor, and a synchronous stator that includes synchronous stator windings positioned on a second radial side of the hollow rotor.

4 Claims, 5 Drawing Sheets

(58) Field of Classification Search
USPC ........................................ 310/156.78, 156.81
See application file for complete search history.

(56) References Cited

U.S. PATENT DOCUMENTS

| | | | | |
|---|---|---|---|---|
| 5,097,166 | A * | 3/1992 | Mikulic | H02K 1/276 310/156.83 |
| 7,183,686 | B2 * | 2/2007 | Sasaki | H02K 1/276 310/156.53 |
| 7,923,881 | B2 * | 4/2011 | Ionel | H02K 1/276 310/156.79 |
| 7,923,882 | B2 * | 4/2011 | Kalluf | H02K 1/276 310/156.83 |
| 8,405,272 | B2 * | 3/2013 | Kikuchi | H02K 1/223 310/156.83 |
| 10,749,390 | B2 * | 8/2020 | Gieras | H02K 19/14 |
| 12,603,560 | B2 * | 4/2026 | Yonemori | H02K 17/26 |
| 2003/0071533 | A1 * | 4/2003 | Kikuchi | H02K 21/46 310/211 |
| 2010/0011806 | A1 * | 1/2010 | Nam | F04C 18/3564 418/136 |
| 2010/0011807 | A1 * | 1/2010 | Nam | F04C 23/008 418/16 |
| 2010/0148613 | A1 * | 6/2010 | Nam | H02K 21/46 310/156.83 |
| 2010/0247347 | A1 * | 9/2010 | Yoshino | H02K 17/18 310/212 |
| 2010/0253174 | A1 * | 10/2010 | Yabe | H02K 17/20 310/212 |
| 2011/0081263 | A1 * | 4/2011 | Yoshino | F04C 23/008 310/212 |
| 2014/0159533 | A1 | 6/2014 | Kondou et al. | |
| 2015/0048704 | A1 * | 2/2015 | Fahimi | H02K 1/278 310/156.01 |
| 2016/0359933 | A1 | 12/2016 | Gould | |
| 2019/0165702 | A1 * | 5/2019 | Chretien | H02P 5/74 |
| 2019/0219020 | A1 * | 7/2019 | Liu | F02N 11/0859 |
| 2021/0257950 | A1 * | 8/2021 | Taniguchi | H02P 25/22 |
| 2022/0407372 | A1 * | 12/2022 | Yen | H02K 1/246 |
| 2023/0024385 | A1 * | 1/2023 | Lim | H02K 16/04 |
| 2023/0026832 | A1 | 1/2023 | Buttner et al. | |
| 2023/0083131 | A1 * | 3/2023 | Choi | H02K 21/46 310/156.78 |
| 2024/0171053 | A1 * | 5/2024 | Mao | H02K 16/02 |
| 2024/0396381 | A1 * | 11/2024 | Ivan | H02K 1/148 |
| 2025/0015694 | A1 * | 1/2025 | Choi | H02K 21/46 |
| 2025/0096709 | A1 * | 3/2025 | Preindl | H02P 21/0017 |

FOREIGN PATENT DOCUMENTS

| | | | |
|---|---|---|---|
| CN | 110460217 | A | 11/2019 |
| CN | 108233652 | B | 12/2019 |
| CN | 111509938 | A | 8/2020 |
| DE | 102013113655 | A1 | 6/2014 |
| EP | 0913914 | A1 | 5/1999 |
| JP | 2004-032984 | A | 1/2004 |
| JP | 5796613 | B2 | 10/2015 |
| JP | 2016-073166 | A | 5/2016 |

* cited by examiner

HYBRID MOTOR

CROSS REFERENCE TO RELATED APPLICATIONS

The present application is a divisional of U.S. patent application Ser. No. 17/850,222, filed Jun. 27, 2022, which is based on, and claims priority from, Korean Patent Application Number 10-2021-0120179, filed Sep. 9, 2021. The entire disclosure contents of these applications are herewith incorporated by reference into the present application.

TECHNICAL FIELD

The present disclosure in some embodiments relates to a hybrid motor of asynchronous and synchronous motors combined. More particularly, the present disclosure relates to a hybrid electric motor having an improved average torque by using a hollow rotor including a conductor bar on one side and a component equivalent of a synchronous motor, namely, a synchronous motor equivalent on the other side.

BACKGROUND

The statements in this section merely provide background information related to the present disclosure and do not necessarily constitute prior art.

With the rise of vehicle electrification as a major issue in the automobile industry, the demand for rare-earth-free electric motors is increasing. Targeted to replace permanent magnet synchronous motors (PMSMs), induction motors are garnering particular attention as rare-earth-free motors. Ongoing research is carried out to improve the induction motors in terms of torque-density, efficiency, and other performance objectives.

FIG. 1 is a partial cross-sectional view of a conventional induction motor including a single stator.

As shown in FIG. 1, the conventional induction motor includes a stator and a hollow rotor. The stator includes a stator core 100 and stator windings 102, the latter being disposed along an outer circumferential surface of conductor bars 104. The hollow rotor includes, besides the conductor bars 104, a rotor core 106. The conductor bars 104 is arranged in an annular form and spaced apart from a rotation axis by a predetermined distance. However, in the single stator-type induction motor as shown in FIG. 1, the stator is disposed solely on the outside of the rotor and magnetic flux flows unilaterally into the conductor bars 104, which entails a limitation to the improvement of torque and output.

Meanwhile, for improving the output of an induction motor, there is a method of using a cooling system or a method of improving the fill factor of armature windings. When a cooling system is used to suppress the temperature rise of the armature windings, heat dissipation from the windings and the cores causes the armature current and current density to increase, resulting in improvements in the armature magnetomotive force and the motor output. When improving the fill factor of armature windings, a decrease in armature resistance reduces the heat generation of the armature windings and increases the armature current under the same conditions of copper loss, thereby increasing the armature magnetomotive force and torque.

However, forcefully reducing the heat generation of the armature windings leads to a limitation in improving the torque of the electric motor. This presents a need for a technology capable of advancing the arrangement of components included in the induction motor or improving the armature magnetomotive force based on a control technology using an inverter.

SUMMARY

According to at least one embodiment, the present disclosure provides a hybrid motor including a hollow rotor, an induction stator, and a synchronous stator. The hollow rotor includes conductor bars configured form to an annular shape at a position spaced apart from a rotation axis by a predetermined first distance, and a synchronous motor equivalent that is disposed in an annular shape at a position spaced apart from the rotation axis by a predetermined second distance. The induction stator includes induction stator windings positioned on a first radial side of the hollow rotor. The synchronous stator includes synchronous stator windings positioned on a second radial side of the hollow rotor.

DETAILED DESCRIPTION

Figure 1:
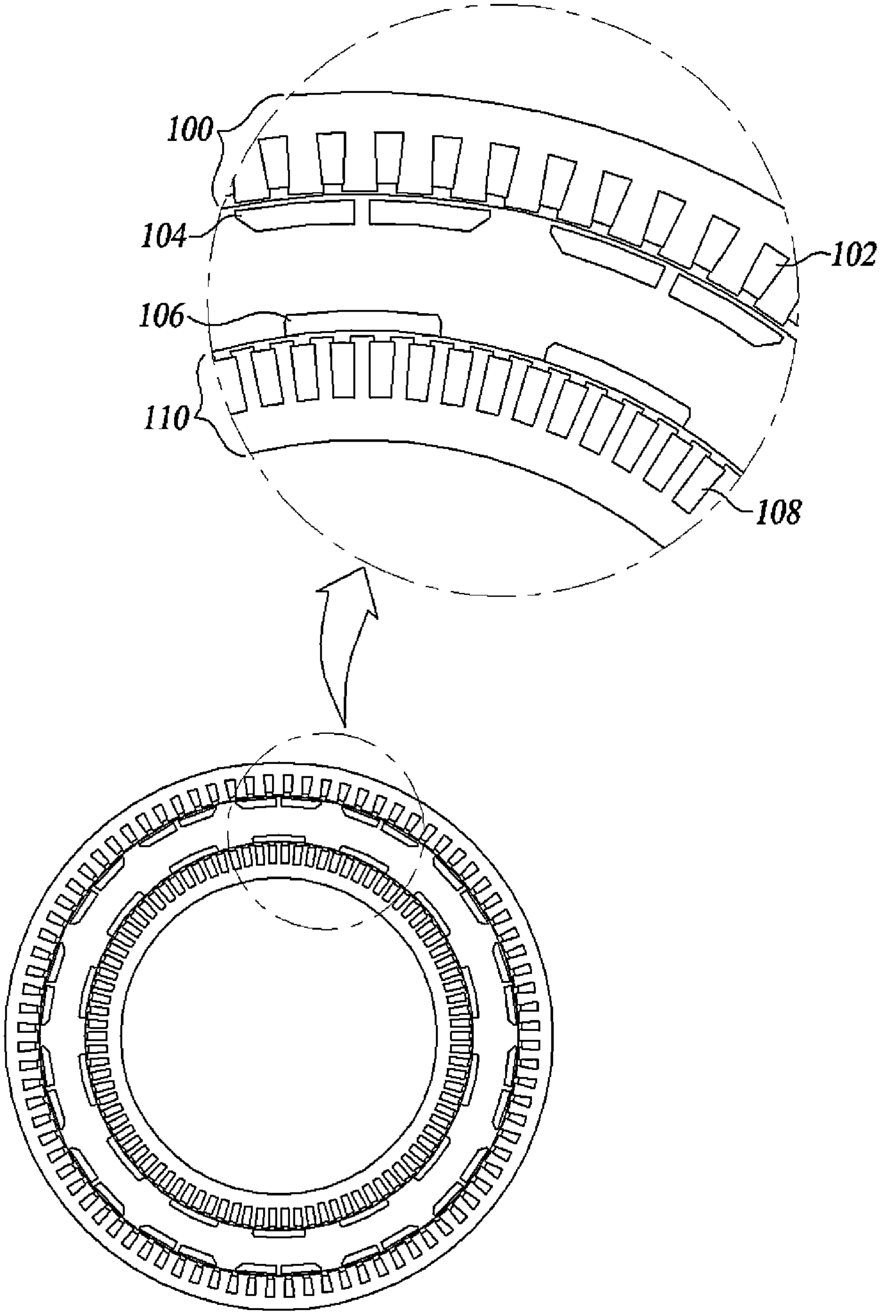
FIG. 1 (Prior Art)
FIG. 1 is a partial cross-sectional view of a conventional induction motor including a single stator.

At least one aspect of the present disclosure seeks to provide a hybrid motor with improved torque density and power density per unit volume by increasing space utilization for generating an armature magnetomotive force with no change in total volume.

Another aspect of the present disclosure further seeks to provide a hybrid motor that prevents a decrease in efficiency due to overheating by dissipating heat generated due to armature copper loss as the motor stator is in a distributed arrangement.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, various terms such as first, second, A, B, (a), (b), etc., are used solely for the purpose of differentiating one component from others but not to imply or suggest the substances, the order or sequence of the components. Throughout this specification, when parts "include" or "comprise" a component, they are meant to further include other components, not excluding thereof unless there is a particular description contrary thereto. The terms such as "unit," "module," and the like refer to units for processing at least one function or operation, which may be implemented by hardware, software, or a combination thereof.

Techniques are in development for improving the performance of motors, for example, torque. With the illustrated embodiments, the present disclosure provides a hybrid motor with improved efficiency by combining an induction motor and a synchronous motor.

More specifically, the present disclosure provides a hybrid motor capable of actively controlling the power density according to the operating region by arranging a hollow rotor with conductor bars placed on one radial side and a synchronous motor equivalent on the other radial side.

The detailed description set forth below in conjunction with the appended drawings is intended to describe exemplary embodiments of the present disclosure and is not intended to represent the only embodiments in which the present disclosure may be practiced.

Figure 2:
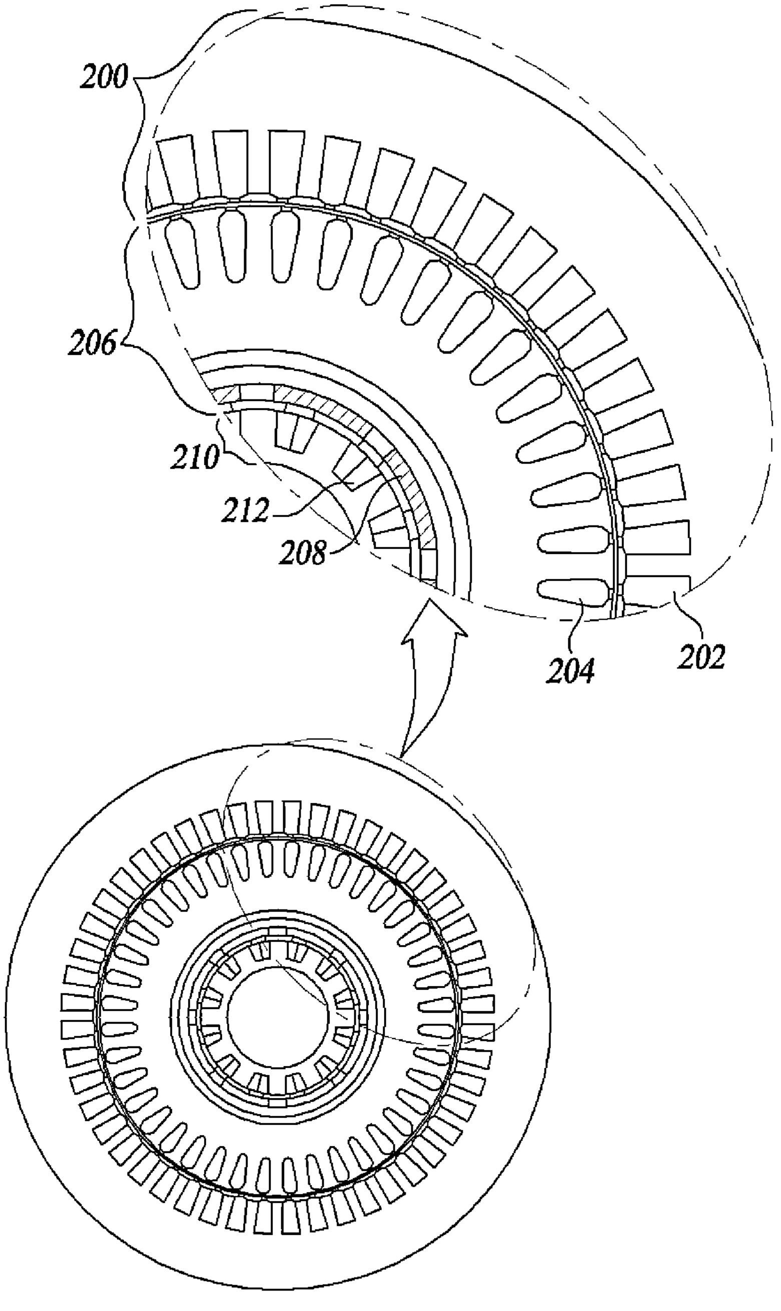
FIG. 2 is a partial cross-sectional view of a hybrid motor of induction and synchronous motors combined according to a first embodiment of the present disclosure.

FIG. 2 is a partial cross-sectional view of a hybrid motor of induction and synchronous motors combined according to a first embodiment of the present disclosure.

The hybrid motor according to at least one embodiment of the present disclosure increases efficiency by a configuration of the synchronous motor and the induction motor combined, over the conventional induction motor including a single stator. The following describes a configuration of the hybrid motor according to the present disclosure and effects thereof by referring to FIGS. 2 and 3.

As shown in FIG. 2, the hybrid motor according to at least one embodiment of the present disclosure includes all or some of an induction stator 200, a hollow rotor 206, and a synchronous stator 210. The respective components included in the hybrid motor are as follows.

The hollow rotor 206 includes conductor bars 204 configured form to an annular shape at a position spaced apart from the axis of rotation by a predetermined first distance and a component equivalent of a synchronous motor, namely, a synchronous motor equivalent disposed in an annular shape at a position spaced apart from the rotation axis by a predetermined second distance. The conductor bars 204 is disposed adjacent to one radial side of the hollow rotor 206, and the synchronous motor equivalent is disposed adjacent to the other radial side of the hollow rotor 206. For convenience sake, FIG. 2 illustrates the conductor bars 204 as being disposed adjacent to the radially outer side of the hollow rotor 206, and the synchronous motor equivalent as being a permanent magnet 208 and disposed adjacent to the radially inner side of the hollow rotor 206. However, the arrangement of the conductor bars 204 and the permanent magnet 208 may be changed according to embodiments. For example, the conductor bars 204 may be disposed adjacent to the radially inner side of the hollow rotor 206, and the permanent magnet 208 may be disposed adjacent to the radially outer side of the hollow rotor 206. In this way, by annularly arranging the conductor bars 204 and the permanent magnet 208 at positions adjacent to both sides of the hollow rotor 206, the hybrid motor according to the present disclosure can operate as either one or both of an induction motor and a synchronous motor. In particular, as shown in FIG. 2, with the permanent magnet 208 used as a synchronous motor equivalent, the synchronous motor operates as a permanent magnet synchronous motor (hereinafter 'PMSM').

The induction stator 200 includes induction stator windings 202 positioned on a first radial side of the hollow rotor 206 and supplies a magnetic flux to the conductor bars 204 included in the hollow rotor 206. In particular, as the hollow rotor 206 rotates by the magnetic flux supplied from the induction stator windings 202, the hybrid motor of this embodiment operates as an induction motor. In FIG. 2, the induction stator windings 202 are arranged along the outer peripheral surface of the hollow rotor 206. However, in another embodiment where the conductor bars 204 is disposed adjacent to the radially inner side of the hollow rotor 206, the induction stator windings 202 are disposed along the inner circumferential surface of the hollow rotor 206.

The synchronous stator 210 includes synchronous stator windings 212 positioned on a second radial side of the hollow rotor 206 and supply the magnetic flux to the permanent magnet 208. Herein, the first radial side and the second radial side may be opposite sides. In particular, as the hollow rotor 206 rotates by the magnetic flux supplied from the synchronous stator windings 212, the hybrid motor of this embodiment operates as a synchronous motor. In FIG. 2, the synchronous stator windings 212 are disposed along the inner peripheral surface of the hollow rotor 206. However, in other embodiments where the permanent magnet 208 is disposed adjacent to the radially outer surface of the hollow rotor 206, the synchronous stator windings 212 are disposed along the outer circumferential surface of the hollow rotor 206.

In at least one embodiment, the induction stator 200 and the synchronous stator 210 are each adapted to receive an electric current from each of separate respective inverters and to be independently controlled according to the operation region of the hybrid motor. For example, the hybrid motor may operate in a high power density mode in which a target power exceeds a preset threshold. At this time, the separate respective inverters may include an induction inverter (not shown) for controlling the induction stator 200 and a synchronous inverter (not shown) for controlling the synchronous stator 210, thereby operating the induction motor and the synchronous motor concurrently. This significantly increases the torque density and power density of the hybrid motor. Meanwhile, the hybrid motor may operate in a low power density mode in which a target power is equal to or less than the preset threshold. The induction inverter or the synchronous inverter may electrically power the induction stator 200 or the synchronous stator 210 alternatively, thereby operating either the induction motor or the synchronous motor. This can improve the efficiency of the hybrid motor according to the present disclosure in its low-load operation.

As described above, controlling the induction stator 200 and the synchronous stator 210 respectively by using the induction inverter and the synchronous inverter enables control with a high degree of freedom for each of various operating environments of the hybrid motor, such as high-torque driving, low-torque driving, starting driving, low-load driving, etc. Additionally, when a failure occurs in either the induction stator 200 or the synchronous stator 210, the trouble-free stator can still operate, thereby securing redundancy for coping with a failure situation.

On the other hand, when concurrently operating the induction motor and the synchronous motor according to the present disclosure, positive torque is generated by supplying currents of different frequencies to the induction stator 200 and the synchronous stator 210. At this time, the frequency of the driving current supplied to the synchronous stator 210 is determined based on the number of rotations of the hollow rotor 206. Additionally, the frequency of the driving current supplied to the synchronous stator 210 is so determined as to bring the rotational speed of a rotating magnetic field generated in the synchronous stator 210 to match the mechanical rotational speed of the hollow rotor 206. In this way, by adjusting the frequencies of the currents supplied to the induction stator 200 and the synchronous stator 210, the hybrid motor according to the present disclosure exhibits efficiency improvement, reduced torque ripple, and reduced harmonics.

In at least one embodiment, the induction stator 200 and the synchronization stator 210 are formed to be different by the number of poles and the number of slots. For example, the induction stator 200 may be configured to have a 4-pole 48-slot structure, and the synchronization stator 210 may be formed in an 8-pole 12-slot structure. In general, the smaller the number of stator poles, the more advantageous for high speed and low torque operation. The larger the number of stator poles, the more advantageous for low speed and high torque operation. Accordingly, the efficiency of the hybrid motor according to the present disclosure can be improved by controlling a large current to be supplied to a stator having a small number of poles during high-speed operation and controlling a large current to be supplied to a stator having a large number of poles during low-speed operation.

As described above, the hybrid motor can operate significantly efficiently by arranging the induction motor and synchronous motor of different pole numbers radially outside and inside the hollow rotor 206, respectively, and then actively controlling the respective motors according to the target output of the hybrid motor. Additionally, compared to a conventional electric motor in which the stator is disposed only on one side of the conductor bars, the present hybrid motor renders the magnetic flux to be supplied from the induction stator 200 and the synchronous stator 210 disposed on both sides of the hollow rotor 206 to increase torque and output. With these stators separately disposed on the outer side and the inner side of the hollow rotor, the present hybrid motor provides a distributed heat source advantageously. Additionally, the present disclosure provides an improved average motor torque by increasing the space where armature magnetomotive force is generated without increasing the volume of the motor.

Figure 3:
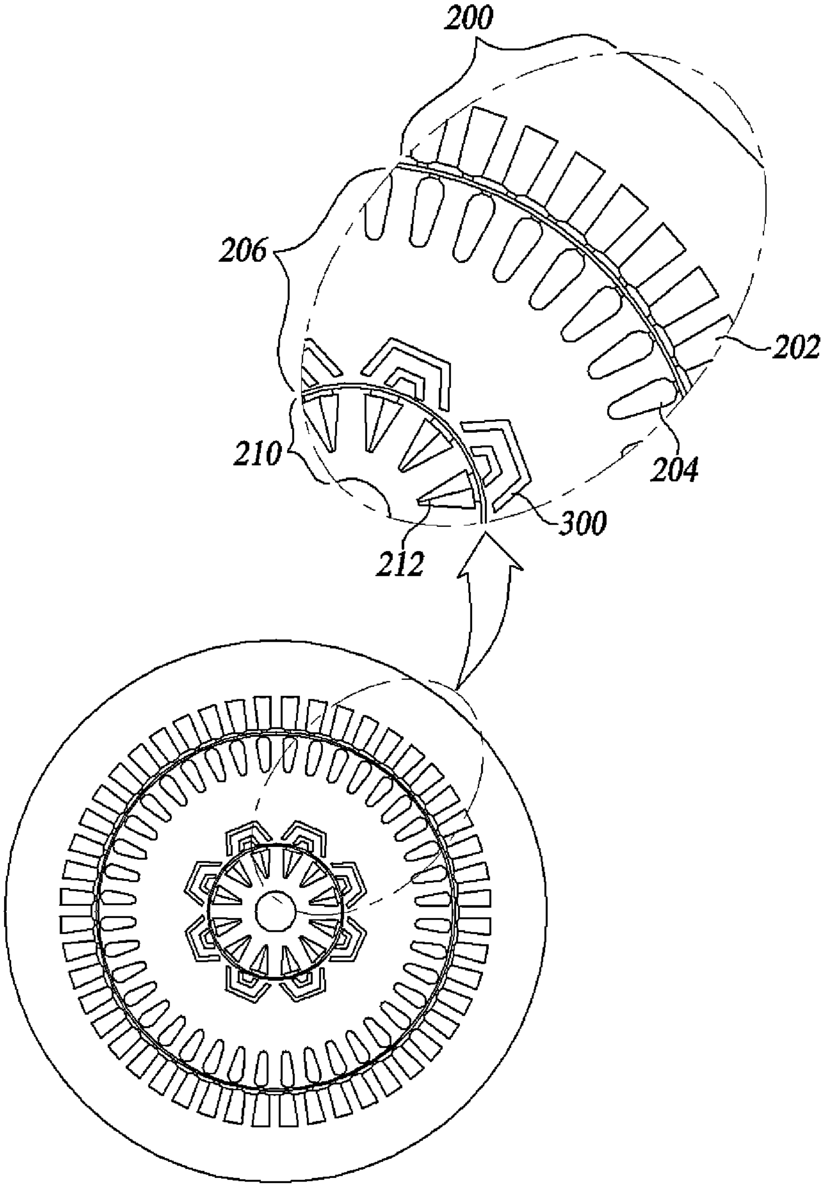
FIG. 3 is a partial cross-sectional view of a hybrid motor of induction and synchronous motors combined according to a second embodiment of the present disclosure.

FIG. 3 is a partial cross-sectional view of a hybrid motor of induction and synchronous motors combined according to a second embodiment of the present disclosure.

The PMSM when used as a synchronous motor according to the present disclosure provides the hybrid motor with performance advantages such as higher torque density, higher output density, and increased efficiency. However, since most permanent magnets save ferrite magnets are manufactured using rare earth elements, it is conceivable that PMSM cannot be manufactured in a difficult environment with a short supply of rare earth materials. To cope with the difficulty, the hybrid motor as shown in FIG. 3 uses a rare-earth-free synchronous motor having an air barrier formed thereon.

The embodiment of FIG. 3 is different from the first embodiment of FIG. 2 employing the permanent magnet 208 as a synchronous motor equivalent in that an air barrier 300 is formed as a synchronous motor equivalent. With the air barrier 300 formed in the hollow rotor 206 as in FIG. 3 to match the synchronous stator 210, a synchronous motor may be formed operating as a synchronous reluctance motor (hereinafter, 'SynRM'). In another embodiment of the present disclosure, the synchronous motor according to the present disclosure may be a wound field synchronous motor (hereinafter 'WFSM') that utilizes a field winding in place of the permanent magnet 208 as a synchronous motor equivalent. Utilizing the WFSM or SynRM for a synchronous motor offers the advantage of using a rare-earth-free synchronous motor that does not depend on rare earth and the advantage of no involvement of drag force.

Meanwhile, the synchronous motor according to the present disclosure may be a variable-flux motor that magnetizes or demagnetizes a magnet having a low coercive force according to an operating region. The variable-flux motor when operating in the high power density mode can secure high power density by magnetizing a permanent magnet, and when operating in a low power density mode, it offers improvements in operating efficiency and fuel efficiency by demagnetizing the permanent magnet to remove drag force.

FIG. 4 is partial cross-sectional views of models for measuring the outputs of hybrid motors of induction and synchronous motors combined according to some embodiments of the present disclosure.

Figure 4A:
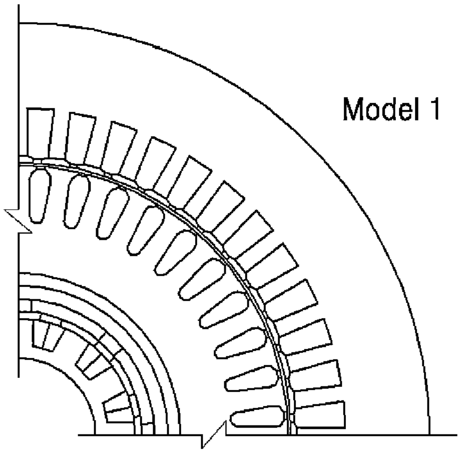
FIGS. 4A, 4B, and 4C are partial cross-sectional views of models for measuring outputs of hybrid motors of induction and synchronous motors combined according to some embodiments of the present disclosure.
Figure 4B:
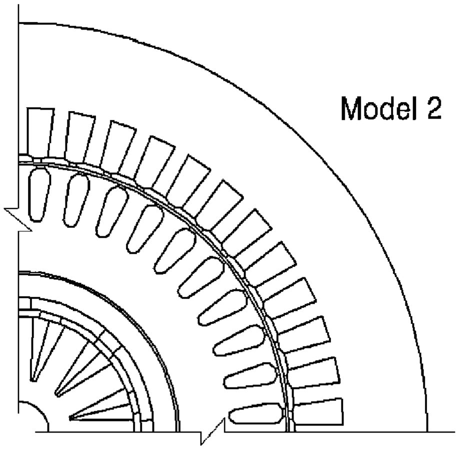
Figure 4C:
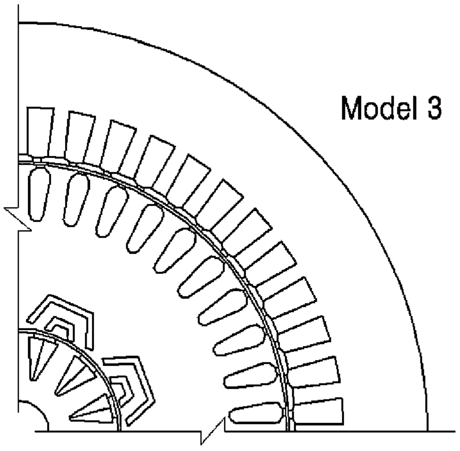

The hybrid motors shown in FIGS. 4A and 4B use the PMSM as a synchronous motor, and the hybrid motor shown in FIG. 4C uses the SynRM as a synchronous motor. The model information and analysis conditions of the hybrid motors shown in FIGS. 4A-4C are shown in Tables 1 and 2.

TABLE 1

| | Item | Value |
|---|---|---|
| Induction Motor (Outside) | Number of Poles/Stator Slots/Rotor Slots | 4/48/40 |
| | Stator Outer Diameter | 216 mm |
| | Lamination Length | 170 mm |
| | Air Barrier Radius | 70.7 mm |
| Synchronous Motor (Inside, Model 1/2/3) | Number of Poles | 8 |
| | Number of Slots | 12 |
| | Air Barrier Radius (Model 1/2/3) | 32.2/26.7/26.7 mm |
| | Stator Inner Diameter (Model 1/2/3) | 40/16/16 mm |
| | Permanent Magnet Residual Magnetic Flux Density | 1.2 T |
| | Number of Equivalent Series Turns | 20 |
| | Number of Parallel Circuits | 2 |

TABLE 2

| | Analysis Conditions | |
|---|---|---|
| | Induction Motor Drive Current (A) | Synchronous Motor Drive Current (A) |
| Basic | 100 | — |
| Model 1 | | 50 |
| Model 2 | | 50 |
| Model 3 | | 400 |

Figure 5:
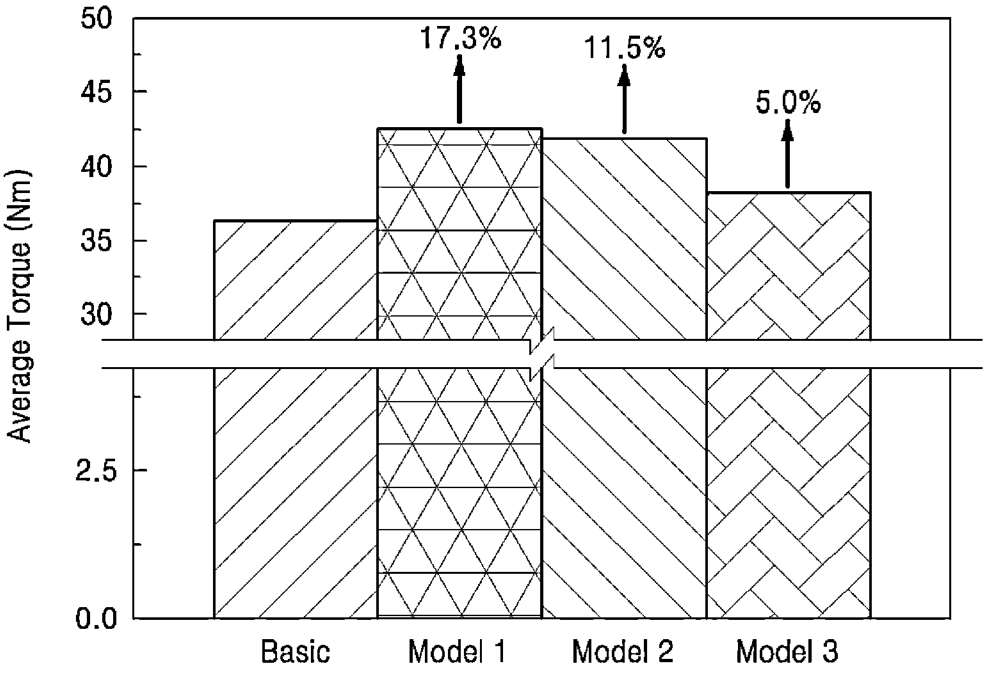
FIG. 5 is a graph showing simulation results regarding the outputs of hybrid motors of induction and synchronous motors combined according to some embodiments of the present disclosure.

FIG. 5 is a graph showing simulation results regarding the outputs of hybrid motors of induction and synchronous motors combined according to some embodiments of the present disclosure.

FIG. 5 exhibits the simulation results in which the average torque is significantly increased in Models 1 to 3 compared to the basic model involving no synchronous motor operation. With Model 3, the increase rate of the average torque is not high for the current applied to the synchronous stator 210, but it has the advantage of reducing the dependence on rare earth by using a rare-earth-free synchronous motor.

According to at least one embodiment of the present disclosure, there is an effect of increasing the efficiency of the motor by selectively driving an induction motor or a synchronous motor according to the operating condition of the motor.

According to another embodiment of the present disclosure, the distributed arrangement of the stator facilitates thermal management, which can improve the armature magnetomotive force without an increase in heat generation.

According to yet another embodiment of the present disclosure, with the wound field synchronous motor (WFSM) or synchronous reluctance motor (SynRM) used as a synchronous motor, rare-earth-free motors can be manufactured.

According to yet another embodiment of the present disclosure, with the variable-flux motor employed as a synchronous motor, a drag force is removed by demagnetizing the magnet having a low coercive force, thereby increasing the efficiency of the motor operation.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

The invention claimed is:

1. A hybrid motor, comprising:

a hollow rotor comprising:

conductor bars configured to form an annular shape at a position spaced apart from a rotation axis by a predetermined first distance; and a synchronous motor equivalent disposed annularly around the rotation axis at positions spaced apart from the rotation axis;

an induction stator including induction stator windings positioned on a first radial side of the hollow rotor; and a synchronous stator including synchronous stator windings positioned on a second radial side of the hollow rotor;

wherein the first radial side is a radially outer side of the hollow rotor, and the second radial side is a radially inner side of the hollow rotor;

wherein the conductor bars and the induction stator are configured to operate as an induction motor;

wherein the synchronous motor equivalent comprises a plurality of air barriers formed in the hollow rotor and arranged at positions corresponding to the synchronous stator;

wherein the plurality of air barriers are spaced apart from each other along a circumferential direction of the hollow rotor;

wherein each of the plurality of air barriers comprises an inner air barrier portion disposed adjacent to the synchronous stator and an outer air barrier portion spaced apart from the inner air barrier portion in a radially outward direction of the hollow rotor; and wherein the plurality of air barriers are configured such that the synchronous motor equivalent and the synchronous stator operate as a synchronous reluctance motor (SynRM).

2. The hybrid motor of claim 1, wherein the induction stator and the synchronous stator are configured to operate concurrently.

3. The hybrid motor of claim 1, wherein one of the induction stator and the synchronous stator is configured to be selectively operated.

4. The hybrid motor of claim 1, wherein the induction stator has a different number of poles than the synchronous stator.

* * * * *